United States Patent [19]

Klös-Hein et al.

[11] Patent Number: 4,977,787
[45] Date of Patent: Dec. 18, 1990

[54] ELECTROMECHANICAL DEVICE FOR CHANGING THE POSITION OF HEAD MOUNTING PLATE IN A MAGNETIC TAPE APPARATUS

[75] Inventors: Karl Klös-Hein, Wettenberg; Horst H. Rumpf, Herborn-Schönbach, both of Fed. Rep. of Germany

[73] Assignee: U.S. Philips Corporation, New York, N.Y.

[21] Appl. No.: 189,276

[22] Filed: May 2, 1988

[30] Foreign Application Priority Data

Dec. 17, 1987 [DE] Fed. Rep. of Germany ....... 3742736

[51] Int. Cl.$^5$ ................... G11B 21/12; G11B 5/54; F16H 25/08; F16H 25/16
[52] U.S. Cl. ............................................. 74/54; 74/96; 360/105; 360/137
[58] Field of Search ................... 360/105, 137; 74/54, 74/96

[56] References Cited

U.S. PATENT DOCUMENTS

| | | | |
|---|---|---|---|
| 4,402,020 | 8/1983 | Yokota et al. | 360/72.1 |
| 4,649,446 | 3/1987 | Deutsch et al. | 360/105 |
| 4,757,405 | 7/1988 | Laudus | 360/105 |

FOREIGN PATENT DOCUMENTS 2910343 3/1979 Fed. Rep. of Germany .
2919279 5/1979 Fed. Rep. of Germany .
3106166 2/1981 Fed. Rep. of Germany .

Primary Examiner—Robert S. Tupper

[57] ABSTRACT

The invention relates to a device for changing the position of a functional element in an electrical apparatus. The particular the head-mounting plate in a magnetic-tape apparatus, the functional element being mechanically movable between a rest position towards which it is spring loaded, and two spaced-apart operating positions, i.e. a first operating position and a second operating position. The functional element is electromagnetically held in the first operating position by an electromagnetic device and, when it leaves said first position owing to the electromagnet device being de-energized, can be held in the second operating position with the aid of the mechanical holding function provided by a mechanical holding device. The mechanical holding device is constructed in such a way that when the functional element is released from the first operating position it can hold said element in the second operating position for a limited time only because its holding force is smaller than the return spring force acting on the functional element. In order to hold said element in the second operating position for a longer time, the mechanical holding function provided by the mechanical holding device can be backed up by an additional magnetic holder acting on the holding device (137).

11 Claims, 6 Drawing Sheets

ELECTROMECHANICAL DEVICE FOR CHANGING THE POSITION OF HEAD MOUNTING PLATE IN A MAGNETIC TAPE APPARATUS

BACKGROUND OF THE INVENTION

The invention relates to a device for changing the position of a functional element in an electrical apparatus, in particular the head mounting plate in a magnetic-tape apparatus, the functional element being electromechanically movable between a rest position, towards which it is spring-loaded, and two spaced-apart operating positions, i.e. a first and a second operating position, which functional element is electromagnetically held in the first operating position by an electromagnet device and, when it leaves said first operating position due to the electromagnet device being de-energised, can be held in the second operating position with the aid of the mechanical holding function provided by a mechanical holding device.

In magnetic-tape apparatuses intended for playing back tape cassettes, in particular Compact Cassettes, it is known to move the magnetic head relative to the magnetic tape inside the cassette. For this purpose the magnetic head is arranged on a head mounting plate which is electromechanically movable. In a rest position of the head-mounting plate the magnetic head is fully withdrawn from the tape; in a first operating position of the head-mounting plate the magnetic head is fully positioned against the tape, referred to as the play position, and in an intermediate position between the first operating position and the rest position the magnetic tape can be moved past the head substantially without any contact. This position is referred to as the cue or MSS-position.

From DE-AS 29 10 243 it is known to hold the head-mounting plate in the rest position by means of a spring. If the head-mounting plate is to be set to the first operating position, an electromagnet is energized to draw the head mounting plate into the first operating position via a lever mechanism. The head-mounting plate can return from this first operating position to the rest position via a latching device at the location of the second operating position if the first magnet is de-energized and, in addition, the latching device is released by a second electromagnet. If the second electromagnet does not release the latching device the head-mounting plate remains in the second operating position for the time being.

SUMMARY OF THE INVENTION

It is the object of the invention to construct a device of the type recited in the opening paragraph in such a way that the functional element can be set from a rest position to two operating positions and can be held in these operating positions by means of a minimal number of parts.

According to the invention this object is achieved in that the mechanical holding device is constructed in such a way that when the functional element is released from the first operating position it can hold said element in the second operating position for a limited time only because its holding force is smaller than the return spring force acting on the functional element, and in that for holding said element in the second operating position for a longer time the mechanical holding function provided by the mechanical holding device is assisted by an additional magnetic holding function acting on the holding device.

The functional element may be the head-mounting plate of a magnetic-tape apparatus but it may also be another functional element, for example, a switching member for changing over between two magnetic-tape decks accommodated side by side in the same housing. The balanced force ratio between the return spring force of the functional element and the holding force of the holding device enables the construction of the apparatus to be simplified because a special release mechanism is no longer needed.

In a further embodiment of the invention the electromagnet device, which holds the functional element in the first operating position, and an additional electromagnet device, which backs up the mechanical holding function of the holding device, are combined to form a single electromagnet device comprising a field coil and two spaced-apart parallel yokes. The use of only one electromagnet enables the mechanical dimensions to be reduced. In addition, the mechanical construction is simplified considerably by the use of only one magnet including the magnet control means.

In a further embodiment of the invention the electromagnet of the device is constructed as a holding magnet in order to give the electromagnet device the function of a holding magnet device. Since the electromagnet is dimensioned to operate only as a holding magnet the heat developed in the magnet coils can be minimised.

In a further embodiment of the invention the functional element comprises a first armature plate adapted to cooperate with the electromagnet device, and in order to hold the functional element in the first operating position, there is provided a spacing member comprising a second armature plate adapted to cooperate with the electromagnet device. The second and the first armature plate are adapted to cooperate with the electromagnet device in the same direction, and the spacing member comprises a latching pin which is spring-loaded in the holding direction and, behind which a latching nose of the functional element is engageable to hold said element in the second (MSS) operating position when it moves from the first (play) operating position towards the rest position. The additional magnetic holding function becomes active before the latching nose has urged away the latching pin.

The electromagnet device thus cooperates with two armature plates, i.e. one on the functional element itself and one on the spacing member. In order to hold the functional element in the first operating position the armature plate of the functional element is held by the electromagnet. In order to hold said element in the second operating position the armature plate of the spacing member is held by the electromagnet. As the element is thus held in the second operating position the second armature plate ensures that the latching device remains latched. When the second armature plate is not held magnetically the mechanical latching function is not adequate to hold the spacing member in the second operating position. When the magnet coil remains de-energized for a prolonged time the functional element is therefore returned to the rest position. However, if the magnet coil is de-energized in order to release the functional element from the first operating position and is re-energized briefly after this, the functional element can move out of the first operating position but is subsequently held in the second operating position, because the second armature plate again holds the latching device electrically; the functional element cannot move out of this second operating position towards the rest position until the electromagnet is de-energized again.

In a further embodiment of the invention the spacing member is pivotable parallel the plane of the functional element about a pivot adjacent the electromagnet device and comprises two latching arms, of which a longer arm carries the second armature plate and a shorter arm carries the latching pin, and there is provided a spring member which loads the spacing member towards the electromagnet device. Since the longer latching arm carries the armature plate an extremely small holding force of the electro magnet is adequate to hold the latching pin behind the latching nose in the second operating position.

In a further embodiment of the invention the spring member is a resilient plastics arm which bears on the apparatus chassis carrying the electromagnet device. The resilient plastics arm can be molded together with the spacing member, which does not entail any additional production or assembly costs.

In a further embodiment of the invention the length ratio between the shorter and the longer latching arm is approximately 1:2.5. Such a length ratio is adequate to hold the latching device in the latching position with a small holding force.

In another embodiment of the invention the electromagnet comprises two superimposed U-shaped yokes which are energized by a single magnet coil and which comprise armature poles which are all situated on one of the end faces, like armature poles being situated pairwise at a distance above one another. Such an arrangement leads to a slight increase in manufacturing cost of the magnet; however, it is substantially cheaper than two separate electromagnets.

In a further embodiment of the invention the armature poles adapted to cooperate with the second armature plate of the spacing member have a larger cross-sectional pole area than the armature poles adapted to cooperate with the first armature plate of the functional element. In this way the force with which the armature plates are held on the armature poles can be influenced. The holding force of the armature plate of the functional element on the electromagnet may be, for example, 8N and the holding force of the armature plate for the stop member may be 14N if pole width is the same and the armature poles are 2 mm high for the first armature plate and 3 mm high for the second armature plate.

The electromagnet has a specific time constant within which the electromagnet can be de-energized and subsequently re-energized. This time constant can be reduced, in accordance with a further embodiment of the invention, in that a higher voltage is applied for re-energisation of the second armature plate. This enables the time between de-energisation by switching off the current and re-energisation by switching on the current to be reduced to, for example, approximately 3 ms.

In a further embodiment of the invention the functional element is a limb of a U-shaped apparatus part, whose base constitutes the head-mounting plate of a magnet-tape apparatus and carries at least one magnetic head and pressure rollers, the other limb being adapted to cooperate with an actuating mechanism and the U-shaped apparatus part being pivotable about a pivot against the action of a return spring in order to move the magnetic head and the pressure rollers towards a magnetic tape, the magnetic tape being situated against the magnetic head in the first operating position (play position) and being slightly lifted off the magnetic head in the second operating position (MSS position).

The invention will now be described in more detail, by way of example, with reference to the accompanying drawings. In the drawings:

DESCRIPTION OF THE PREFERRED EMBODIMENTS

Figure 1:
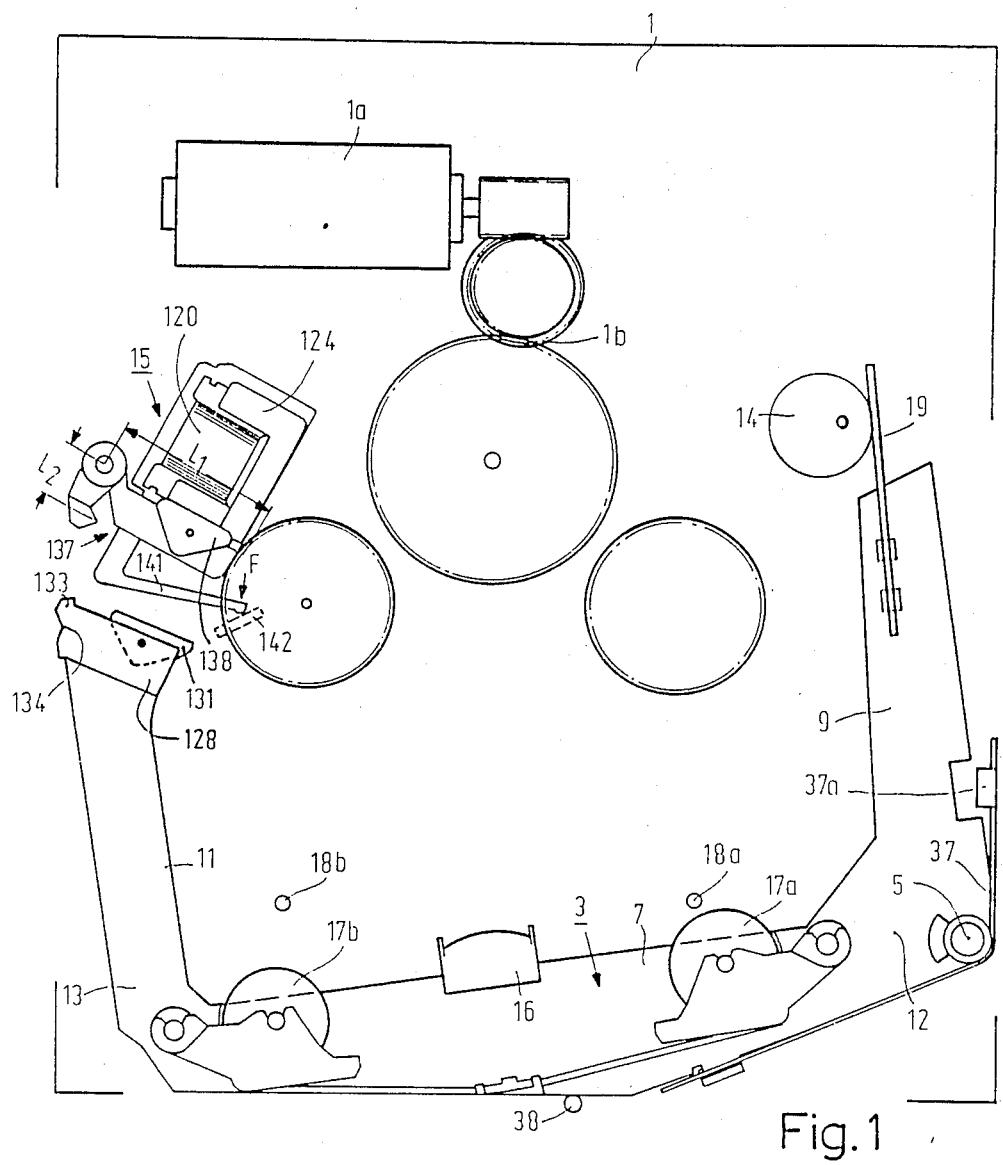
FIG. 1 shows a part of a magnetic tape apparatus comprising a deck plate which supports a head-mounting plate so as to be pivotable about an eccentric pivot, the head mounting plate being pivoted into its rest position under the influence of spring force, two operating positions being defined by a holding magnet device.

The drawings show a deck plate 1 which servers as a chassis for a magnetic-tape cassette apparatus which comprises an apparatus part 3 which is pivotable about an eccentric pivot 5. The apparatus part 3 is U-shaped and comprises limbs 9 and 11 which project in the same direction from the ends of its base 7 which constitutes a head mounting plate. At the location where the limbs 9 and 11 are connected to the ends of the base they form corner portions 12 and 13. The limb 9 cooperates with an actuating member 14 and the limb 11 constitutes a functional element which is adapted to cooperate with holding electromagnet device.

The head-mounting plate 7 of the apparatus part 3 carries a magnetic head 16 and pressure rollers 17a, 17b, which are pivotable relative to the head mounting plate 7, in a manner which is not described. The pressure rollers 17a and 17b can be applied to the capstans 18a and 18b in order to move a magnetic tape, not shown, past the magnetic head 16 in one of the two directions.

The apparatus part 3 is pivoted via actuating member 14 constituted by an eccentric. This actuating member 14, which obviously may also be constructed as a rod, influences a spring 19 which is attached to the limb 9. The apparatus part 3 is pivotable about the eccentric pivot 5 via the actuating member 14 each time that the actuating member 14, which can revolve for example in the clockwise direction, is actuated. A return spring 37 tends to pivot the apparatus part 3 carrying the magnetic head 16 and the pressure rollers 17a, 17b back into the rest position.

The holding magnet device 15 comprises an electromagnet 120 having a magnet coil 121. The magnet coil 121 is wound on a hollow coil former 122 having coil flanges 123. The coil former 122 is traversed by two U-shaped armatures 124 and 125, of which only two limbs 124a and 125a extend through the coil former 122 and the other limbs 124b and 125b are situated outside the magnet coil 120. The armatures 124 and 125 comprise armature poles 124c, 124d and 125c, 125d which are all situated at an axial end 126 of the magnet coil 121. All the armature poles are disposed in one plane. The poles are arranged pairwise in such a way that the armature poles 124c and 125c are situated before the coil end 126 at a distance above one another and the poles 124d and 125d are also situated pairwise above one another. All the armature poles have a unitary width b; their height is different. The height of the armature poles 124c and 124d is smaller than that of the armature poles 125c and 125d. In a practical embodiment the armature poles 124c and 124d have a height d1 of approximately 7 mm and the armature poles 125c and 125d have a height d2 of approximately 10.5 mm.

Figure 2:
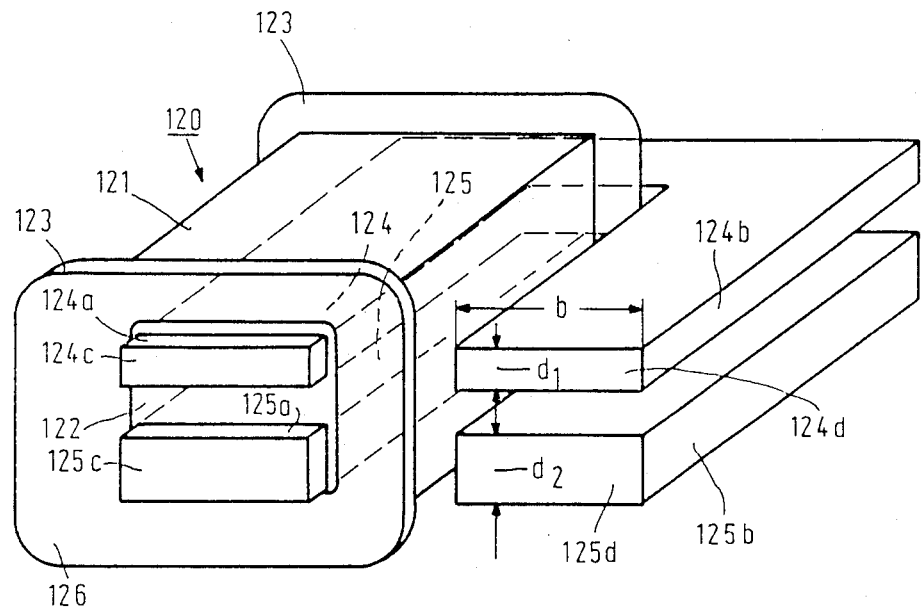
FIG. 2 shows an electromagnet of the holding magnet device.
Figure 3:
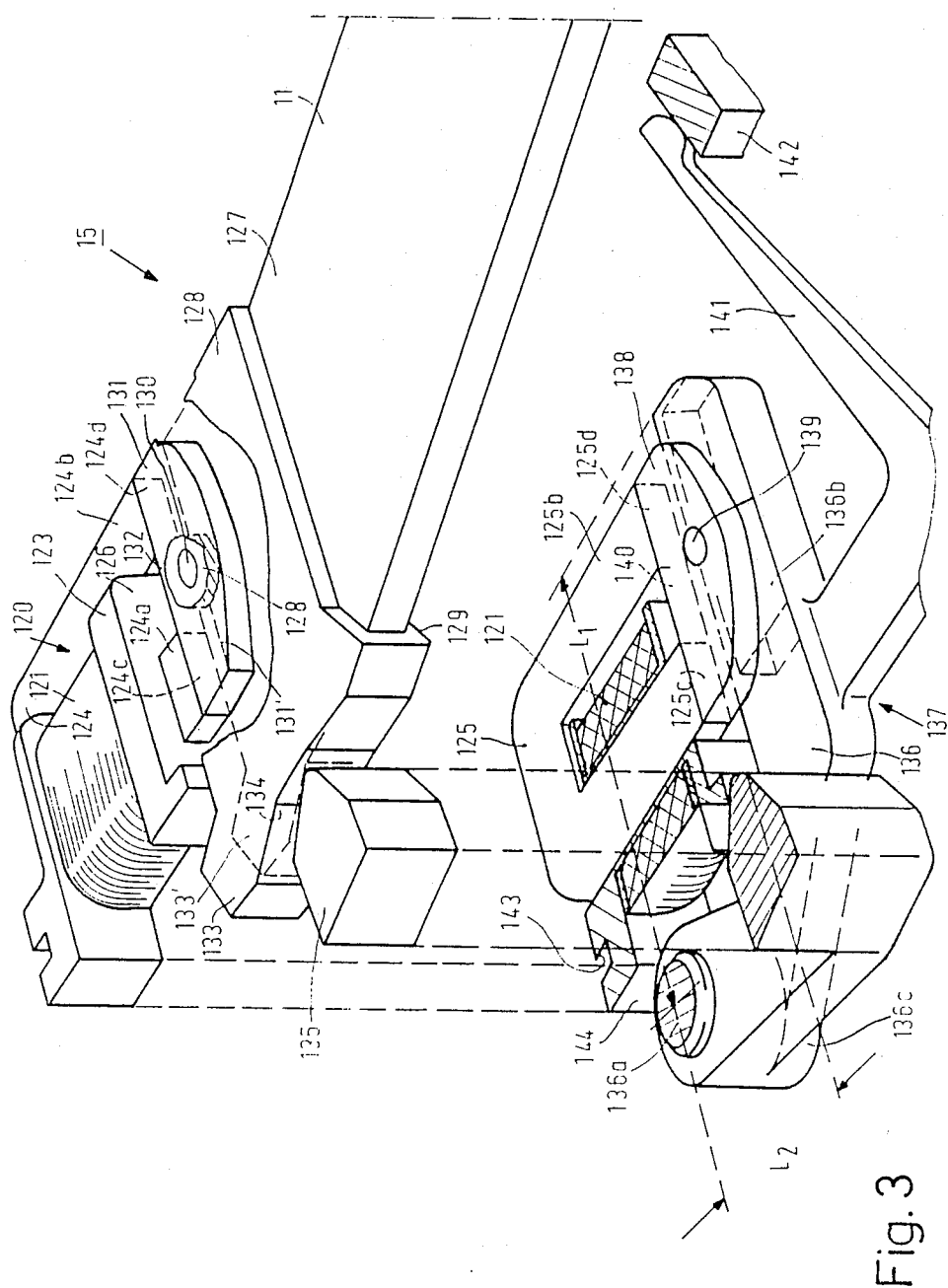
FIG. 3 shows the holding magnet device which enables the head-mounting plate to be held, in particular, in two predetermined operating positions.

FIG. 3 shows the holding magnet device 5 in two parts to clarify its construction and operation. The front portion 127 of the functional element 11 comprises a moulded-on plastics base 128. At its underside this moulded-on plastics base carries a soft-iron armature plate 131 by means of a pivot 130. This armature plate 131, hereinafter referred to as the first armature plate, can be positioned against the armature poles 124c and 124d with its end face 132. The armature plate 131 is pivotable in a plane parallel to the plane of the functional element 11. The plastics base 128 comprises a molded-on nose 133 behind which, viewed towards the functional element 11, a recess 134 is formed. A latching pin 135 is engageable in the recess 134. This latching pin 135 is moulded on a spacing member 136, which is the central part of a holding device 137. The spacing member 136 is pivotable about a pivot 136a. The spacing member 136 carries a second armature plate 138, which is pivotable about a pivot 139 in a plane parallel to the functional element. The length L1 of the spacing member between the pivot 136a and its free end (latching arm 136b) corresponds to 2.5 times the length L2 of the spacing member between the pivot 136a and the latching pin 135 (latching arm 136c). The end face 140 of the second armature plate 138 can be positioned against the armature poles 125c and 125d of the armature 125. As can be seen in FIG. 2 the armatures 125 and 124 extend parallel to and above one another. The spacing member 136 comprises a resilient plastics arm 141 which bears against a stationary chassis portion 142. The resilient plastics arm 141 always urges the second armature plate 138 slightly against the armature poles 125c and 125d via the spacing member 136.

At its rear the holding magnet device has, for example, a groove 143 to secure the holding magnet device 15 to a chassis portion. A support 144, in which the groove 143 is formed, also carries the pivot 136a for the spacing member 136. The operating position shown in FIG. 3 is the play position, in which the functional element 11 is in its most advanced position and the first armature plate 131 and the second armature plate 138 are positioned against the respective armature poles 124c, 124d and 125c, 125d.

Reference is now made again to FIG. 1, in which the head-mounting plate is shown in its rest position. It can be seen that the functional element 11 is disengaged from the holding magnet device 15 and the first armature plate 131 is consequently remote from the armature 124. The latching nose 133 and the recess 134 are free. The plastics arm 141 urges the second armature plate 138 against the armature poles 125c and 125d. The plastics arm 141 exerts a force F on the stationary chassis portion 142 of the deck plate 1. In this rest or stand-by position the electromagnet 120 is de-energized.

The spring 37, which is attached to the deck plate 1 by means of a clip 37a ensures that the head-mounting plate 7 is pivoted anti-clockwise, said plate abutting against a stop 38. Both the magnetic head 16 and the pressure rollers 17a and 17b are entirely clear of a magnetic tape, not shown, which moves between the pressure rollers/capstan pairs 17a, 18a/17b, 18b past the magnetic head 16.

When the apparatus is put into operation and the head-mounting plate 7 must be set to its play position, i.e. the first operating position, a drive motor 1a which rotates the actuating member 14 via a mechanism 1b, in a manner not shown. This actuating member may alternatively be a slide. When the actuating member 14 is rotated in the direction indicated by the arrow the head-mounting plate 7 is pivoted clockwise. If the electromagnet 120 is now energised, all the armature poles 124 and 125 are magnetized. If the functional element 11 moves the armature plate 131 towards the associated magnet poles 124c and 124d, this plate will stick to these armature poles, thus holding the head-mounting plate 7 in the play position. The actuating member 14 is rotated further, allowing the spring 19 to relax. The head-mounting plate 7 is now only held in the first operating position, the play position, by means of the electromagnet 120, which is constructed as a holding magnet.

Figure 4:
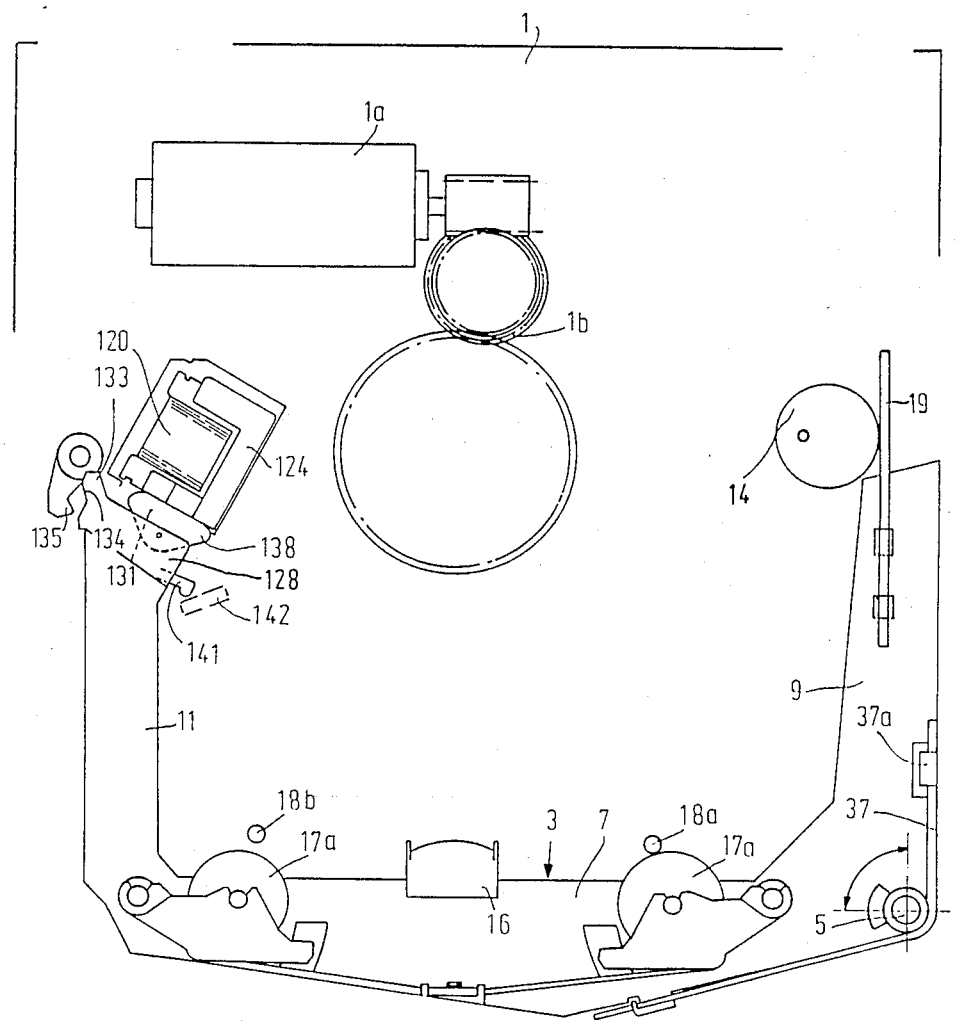
FIG. 4 shows the head-mounting plate in a position in which the holding electromagnet device holds the head-mounting plate in a pivoted position in which the magnetic head has reached the play position.

FIGS. 3 and 4 show this play position. In the play position the second armature plate 138 is also drawn against the armature poles in the same way as the first armature plate 131.

If the head-mounting plate is to return directly from the play position shown in FIGS. 3 and 4 to the rest position only the electromagnet 120 is de-energized. The armature poles 124 and 125 release the armature plates and the functional element 11 moves towards the rest position, the latching nose 133 abutting against the latching pin 135 which has engaged the recess 134. This delays the spring-return of the functional element. As it abuts against the latching pin the latching nose 133 pivots the spacing member 136 clockwise against the opposing force exerted by the plastics arm 141 to move past the latching pin 135 which pivots away, and the functional element 11 returns to its rest position shown in FIG. 1.

However, to proceed from the first operating position to an intermediate position, for example the cue or MSS (music sensing system) position, for fast forward and reverse operation, the electromagnet 120 is also de-energised. The latching nose 133 abuts against the latching pin 135 which has engaged the recess 134. The anti-clockwise movement of the functional element 11 towards the rest position is discontinued at the location where the latching nose 133 abuts against the latching pin 135. At this instant the first armature plate 131 has already become disengaged from the armature poles 124. As a result of the return force exerted by the plastics arm 141 the second armature plate 138 is not yet disengaged from the armature poles 125c and 125d. It still occupies the position shown in FIG. 3, in which it is positioned against the armature poles 125c and 125d. The return springforce of the functional element 11 is larger than the holding force exerted by the plastics arm 141. The latching device 133 to 135 cannot hold the functional element 11 in the second operating position. The element is held in the second operating position by the electromagnet 120 which is re-energised briefly after its de-energisation. As a result of the re-energisation the holding force of the spacing member 136 and consequently of the latching pin 135 is increased to such an extent that the latching nose 133 cannot move past the latching pin 135.

Figure 5:
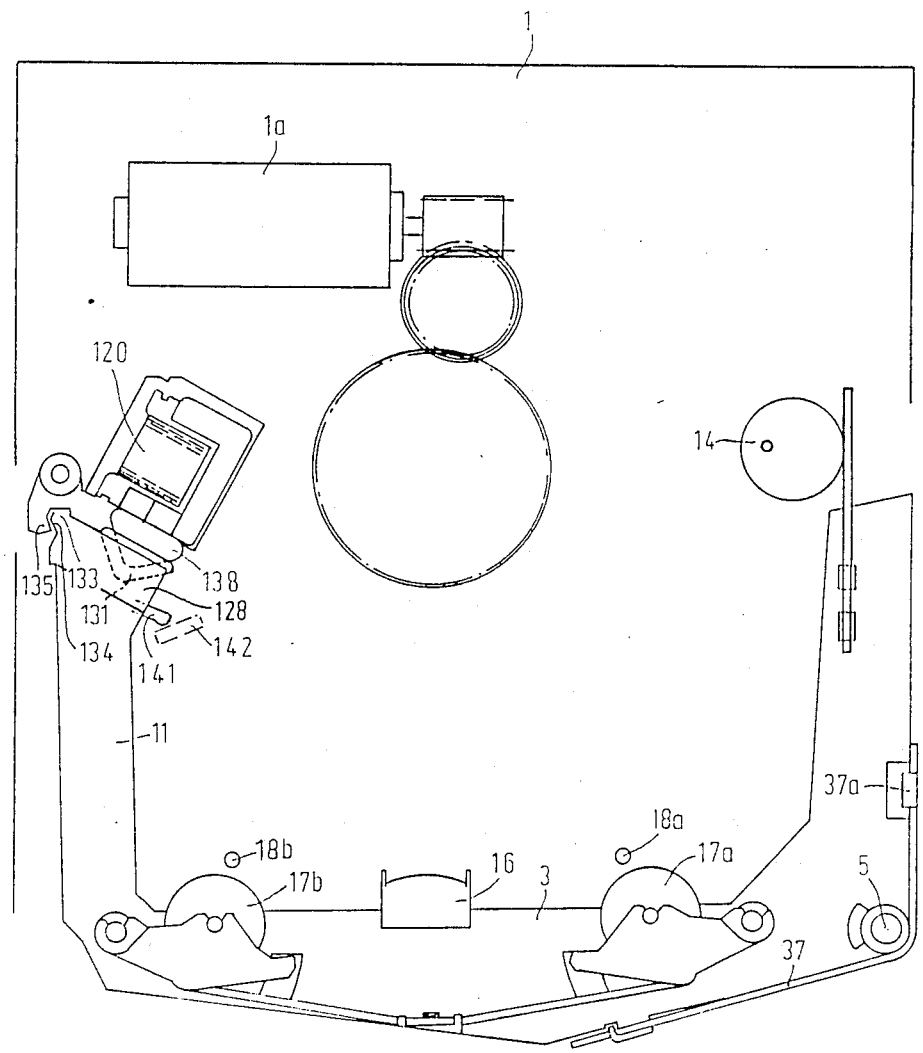
FIG. 5 shows the head-mounting plate in a position in which the magnetic head is lifted slightly off the magnetic tape, but in which a first armature plate is positioned against the holding electromagnetic device.

FIG. 5 shows the second operating position in which the first armature plate 131 is slightly withdrawn but the second armature plate 138 is still positioned against the armature poles 125c and 125d. The magnetic force exerted on the armature plate 138 by the associated armature poles ensures that the latching pin 135 retains the latching nose 133.

To proceed again from the second operating position to the first operating position the actuating member 14 must pivot the head-mounting plate clockwise so that the armature plate 131 can again be held magnetically by the armature poles 125c and 125d. A return of the head-mounting plate 7 from the second operating position shown in FIG. 5 to the rest position shown in FIG. 1 is possible by de-energising the magnet coil 120.

Figure 6:
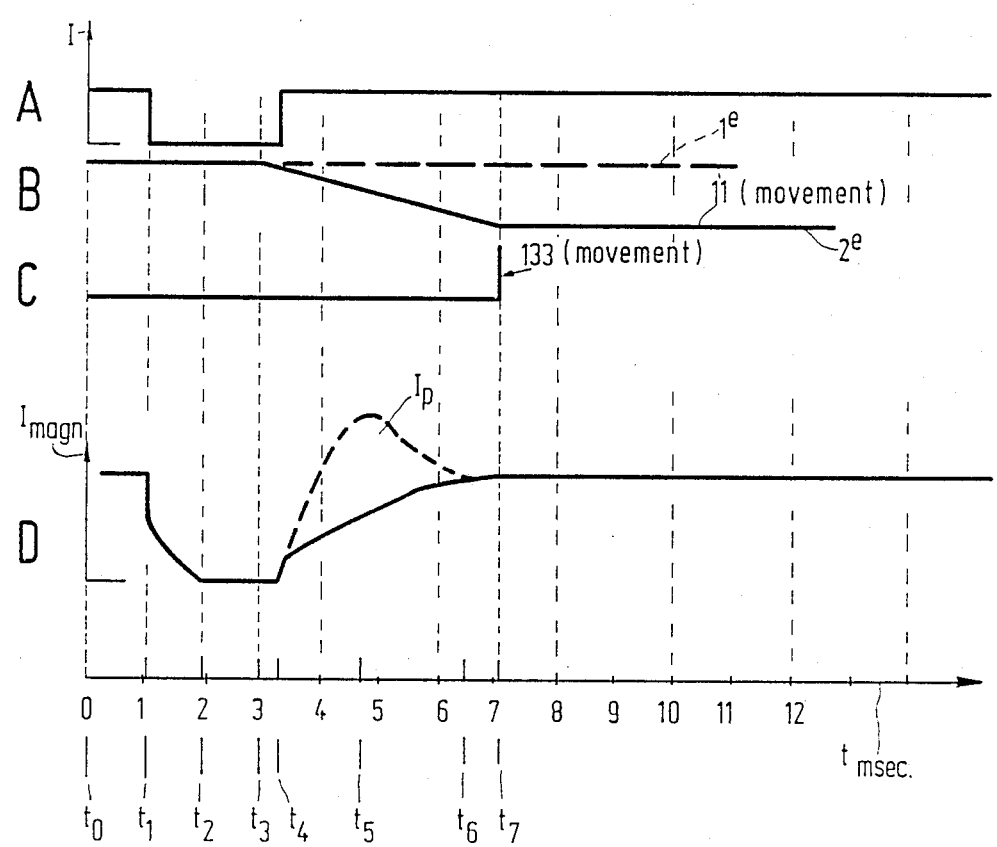
FIG. 6 shows a number of functional diagrams illustrating the time relationship between the functions performed to achieve holding in the second operating position.

The function performed during a change-over from the first operating position to the second operating position take place very shortly after one another within a time interval of approximately 4 ms. These functions will be described in detail with reference to the functional diagram in FIG. 6. In FIG. 6 a number of interrelated functions are plotted against a horizontal time scale in miliseconds. The upper diagram A represents the energising current. The next diagram B represents the movement of the functional element 11. The diagram C represents the movement of the latching nose 133. Finally, the diagram D represents the magnetizing current of the electromagnet or the magnetizing condition of the yoke.

It is assumed that at the instant $t_0$ the functional element 11 and the armature plate 131 are positioned agains the armature poles 124c and 124d and that the coil 121 is energized. The functional element 11 is then in its first operation position or play position (1°). By pressing a push-button at the instant $t_1$ the command is given that the functional element 11 is to be set to the second operating position or MSS position (2°). As a result of this command the energizing current I is switched off. The diagram A shows that the energising current is switched off at the instant $t_1$. The magnetization of the armature ceases when this current is switched off. At the instant $T_2$, as is shown in the diagram D, only a residual magnetisation exists. Since the magnetisation of the armature poles has ceased, the functional element 11 is released with a specific time delay. Immediately after this release has begun at the instant $t_3$ the energising current of the coil 121 is switched on again, namely at the instant $t_4$. Diagram D shows that the magnetisation of the armature poles increases again. At the instant $t_6$ the magnetisation of the armature poles is restored to substantially its normal value and at the instant $t_7$ the latching nose 133 is situated before the latching pin 135. In FIG. 3 this situation is indicated by the dashed latching projection 133'. The armature plate 138, which is still held against the armature poles 125c and 125d by means of the plastics arm 141 is now held by the armature poles 125c and 125d. Thus, the functional element 11 is held in the MSS or cue position.

It may be advantageous if at the instant $t_4$ the energising voltage applied to the magnet coil 121 is higher than normal. The magnetisation of the armature poles at the instant $t_5$ then has already reached such a value that the holding force provided by the armature poles 125c and 125d backs up the force provided by the plastics spring 141 to such an extent that the sum of the resulting magnetic holding force and the mechanical holding force is larger than the return spring force of the functional element 11. The time interval in which the magnet coil 121 is not energised ($t_1$ to $t_4$) is approximately 2.3 ms. When the over-voltage pulse $I_p$ is applied, which leads to the magnetisation at the instant $t_5$, the time interval $t_1$ to $t_4$ can be prolonged to approximately 3 ms. This constitutes an additional security. The device then requires approximately 4 ms to switch the functional element 11 from the first operating position (1°) to the second operating position (2°).

The combination of mechanical and electrical functions in order to reach the MSS position leads to a very simple construction. Altogether the construction with the double-armature magnet substantially simplifies the construction of a tape deck.

U.S. application Ser. No. 189,096 filed May 2, 1988 simultaneously with this application, discloses a device for holding the head mounting plate in first and second operating positions which comprises an armature plate being mounted on a slide on the head mounting plate. The slide is movable between two positions on the head mounting plate, one closer to the electromagnet than the other. With the slide in the position closest to the electromagnet, the head mounting plate is secured in the second operating position when the armature plate is held against the electromagnet.

What is claimed is:

1. In an electrical apparatus comprising a functional element mounted for movement between a rest position and first and second operating positions, said first operating position being spaced further from said rest position than said second operating position, return biasing means for biasing said functional element to said rest position from said first and second operating positions, means for moving said functional element from said rest position to said first operating position, and first electromagnetic holding means for electromagnetically holding said functional element in said first operating position, the improvement comprising:

control means for controlling the position of said functional element upon release of said functional element from said first electromagnetic holding means and movement towards said rest position caused by said biasing means, said control means comprising means for exerting a holding force on said functional element smaller than said return bias for holding said functional element in said second operating position for a predetermined limited time, and second electromagnetic holding means for exerting an additional holding force on said functional element within said predetermined limited time for holding said functional element in said second operating position.

2. In an electrical apparatus as claimed in claim 1, wherein said first and second electromagnetic holding means consist of a single electromagnetic device comprising a field coil and two spaced parallel yokes.

3. In an electrical apparatus as claimed in claim 2, wherein said electromagnetic device is a holding magnet.

4. An electrical apparatus as claimed in claim 3, said control means further comprising:

said functional element having a latching nose and a first armature plate coactive with said electromagnetic device for holding said functional element in said first operating position, and a spacing member comprising a second armature plate coactive with said electromagnetic device and a latching pin biasable towards said functional element, said spacing member being arranged such that when said functional element is released from said first operating position upon de-energization of said first electromagnetic holding means and moves towards said rest position, said latching pin holds said functional element in said second position for only said predetermined period of time when said electromagnetic device is not energized, and said latching nose securing said functional element in said second operating position when said electromagnetic device is re-energized within said predetermined time period, said first and second armature plates being attracted by said electromagnetic device in the same direction.

5. In an electrical apparatus as claimed in claim 4, wherein said spacing member is pivotable parallel to the plane of said functional element about a pivot adjacent the electromagnetic device and comprises two latching arms, of which a longer arm carries the second armature plate and a shorter arm carries the latching pin, and a spring member which loads the spacing member towards the electromagnetic device.

6. In an apparatus as claimed in claim 5, further comprising a chassis carrying the spacing member, and said spring member is a resilient plastic arm bearing on a portion of said chassis.

7. In an electrical apparatus as claimed in claim 5, wherein the length ratio between said shorter and said longer latching arm is approximately 1:2.5.

8. In an electrical apparatus 2 as claimed in claim 2, wherein said electromagnetic device comprises two superimposed U-shaped yokes and a single field coil for energizing said two yokes, the end faces of the leg ends of the U-shaped yokes comprising armature poles, the armature poles of one U-shaped yoke being positioned for electromagnetically holding said first armature plate.

9. In an electrical apparatus as claimed in claim 8, wherein the armature poles of the second U-shaped yoke have a larger cross-sectional pole area than the armature poles of the first U-shaped yoke.

10. A device as claimed in claim 8, comprising means for applying an increased voltage to the electromagnetic device for reducing the time constant of the electromagnetic device during re-energisation of the second armature plate.

11. An electrical apparatus as claimed in claim 1, further comprising:

said functional element having a latching nose and a first armature plate coactive with said first electromagnetic holding means for holding said functional element in said first operating position, and a spacing member comprising a second armature plate coactive with said second electromagnetic holding means and a latching pin biasable towards said functional element, said first and second armature plates being attracted by said first and second electromagnetic holding means in the same direction, said spacing member being arranged such that when said functional element is released from said first operating position upon de-energization of said first electromagnetic holding means and moves towards said rest position, said latching pin holds said functional element in said second operating position only for said predetermined period of time when said second electromagnetic holding means is not energized, and said latching nose securing said functional element in said second operating position when said second electromagnetic holding means is re-energized within said predetermined time period.

* * * * *